United States Patent [19]

van Lier et al.

[11] Patent Number: 4,503,133
[45] Date of Patent: Mar. 5, 1985

[54] LEAK RESISTANT GALVANIC CELL AND PROCESS FOR THE PRODUCTION THEREOF

[75] Inventors: Johannes A. van Lier, Euclid, Ohio; Hirotsugu Yasuda, Newburg, Mo.

[73] Assignee: Union Carbide Corporation, Danbury, Conn.

[21] Appl. No.: 613,196

[22] Filed: May 23, 1984

Related U.S. Application Data

[63] Continuation-in-part of Ser. No. 564,491, Dec. 22, 1983, abandoned.

[51] Int. Cl.$^3$ ............................................. H01M 2/08
[52] U.S. Cl. ................................... 429/174; 429/185; 29/623.5
[58] Field of Search ............... 429/174, 185; 29/623.5

[56] References Cited

FOREIGN PATENT DOCUMENTS 90146 7/1978 Japan .

OTHER PUBLICATION

Kirk-Othmer, *Encyclopedia of Chemical Technology*, vol. 10, pp. 258-260, 262-265 and 275

Primary Examiner—Donald L. Walton
Attorney, Agent, or Firm—William E. Dickheiser

[57] ABSTRACT

Galvanic cells having at least a portion of their sealing surfaces and/or corrodible members coated with a sputtered or plasma polymerization deposited layer of polymeric material no more than 2000 angstroms thick demonstrate increased resistance to electrolyte leakage and/or increased resistance to corrosion.

60 Claims, 7 Drawing Figures 4,503,133

LEAK RESISTANT GALVANIC CELL AND PROCESS FOR THE PRODUCTION THEREOF

CROSS-REFERENCES TO RELATED APPLICATIONS

This application is a continuation-in-part of application Ser. No. 564,491, filed Dec. 22, 1983 which is now abandoned.

FIELD OF THE INVENTION

This invention relates to a sealed galvanic cell wherein at least a portion of the surface of at least one of the components of the cell's housing or of a corrodible cell component is coated with a tightly adhering layer of polymeric material which is no thicker than about 2000 angstroms, such layer having been deposited by plasma polymerization or sputtering. Such cell demonstrates enhanced resistance to electrolyte leakage and/or enhanced resistance to corrosion. Also provided is a process for treating cell components so as to produce a cell exhibiting enhanced resistance to corrosion and/or electrolyte leakage.

BACKGROUND OF THE INVENTION

A continuing concern in the manufacture of galvanic cells is that electrolyte may creep through a sealed interface of the cell and leak out of the cell. Electrolyte leakage may shorten cell life and can also cause a corrosive deposit to form on the exterior surface of the cell which detracts from the cell's appearance and marketability. These corrosive salts may also damage the device in which the cell is housed. Electrolyte leakage occurs in cell systems having aqueous or nonaqueous electrolytes, such as organic solvent-based electrolytes and liquid inorganic cathode-electrolytes, for example those based on thionyl chloride and sulfuryl chloride. Electrolytes such as alkaline electrolytes have an affinity for wetting metal surfaces and are known to creep through a sealed interface of a galvanic cell.

In the prior art it has been a conventional practice to incorporate an insulating gasket between the cell container and cover so as to provide a seal for the cell. Generally, the gasket must be made of a material inert to the electrolyte contained in the cell and the cell environment. In addition, the cell gasket must possess sufficient flexibility and resistance to cold flow under pressure as well as being able to maintain these characteristics so as to insure a proper seal during long periods of storage. Materials such as nylon, polypropylene, and high density polyethylene have been found to be suitable as gasket materials for most applications.

However, the use of a compressible gasket alone has not proved sufficient to reduce cell leakage to commercially acceptable standards. Accordingly, several approaches have been taken in the prior art in order improve the leakproofness of galvanic cells. Among the approaches which have been taken in the past is the deposition of a polymeric layer at the cell container/gasket and/or cover/gasket interface.

For example, U.S. Pat. No. 4,282,293 discloses an improved seal for alkaline cells wherein a film of a substituted organosilane is disposed and compressed between the interface of the cell cover and a coated gasket, such film being deposited utilizing a solvent which is subsequently evaporated. Preferably such film has a thickness of between 10 and 100 angstroms.

Japanese Patent Application No. 90146/1978 discloses the formation of a fluoropolymer film by sputtering or plasma deposition onto the surfaces of electrochemical cells in order to reduce electrolyte leakage. This patent application indicates that the thickness of the film deposited should be at least 3000 angstroms in order to avoid pinholes.

However, even these cell constructions are not successful in stopping cell leakage. Although not wishing to be held to any theory, applicants surmise that a major reason for the failure of the prior art ultra thin films to successfully prevent electrolyte leakage is that such films do not sufficiently adhere to the cell container and/or cover and/or gasket substrate.

It is believed that the resistance to chemical reactions which take place at the interface of a substrate and a polymeric coating and, hence the resistance of such interface to electrolyte leakage, can be considered to be dependent on four major factors: (1) the permeability of the coating to the electrolyte solvent; (2) the electrolyte repellency of the coating; (3) the adhesion of the coating to the substrate; and (4) the passivation effect on the interface caused by the coating. In the case of thick film coatings the permeability of the coating and the electrolyte repellence of the coating itself play predominant roles, with the third and fourth factors mentioned above playing a relatively minor roles.

However, in ultrathin film coatings, the role of the permeability factor becomes minimal due to the fact that the overall transport resistance is the ratio of the film thickness to permeability. For instance, water molecules pass through most organic polymers rather easily, and the time lag of diffusion of water through a 0.1 mm thick layer is well below a fraction of a second and it is nearly impossible to stop the penetration of water to the substrate/film interface. Consequently the adhesion characteristics, particularly the wet adhesion properties, become a vitally important factor in the overall chemical resistance of the interface. The adhesion and passivation effects of an ultrathin film are often closely related and are often inseparable characteristics of such a coating.

Thin films produced by evaporation methods, such as that employed in U.S. Pat. No. 4,282,293 are subject to pinhole formation, whereas films formed by sputtering or plasma polymerization do not generally contain pinholes. See Kirk-Othmer, *Encyclopedia of Chemical Technology*, Vol. 10 at page 275, John Wiley & Sons (3d Ed. 1980). Thus evaporation produced films such as those described in U.S. Pat. No. 4,283,293 will provide poorer protection for the substrate surface due to the presence of such pinholes. Moreover, such lower energy film deposition processes result in the polymeric film having a relatively poor adhesion to the substrate.

While Japanese Patent Application No. 90146/1978 employs higher energy means of coating the fluoropolymers on the cell surfaces, thin layers of about 300 angstroms of such fluoropolymers possess relatively poor maintenance of wet adhesion notwithstanding said application means as evidenced by the relatively poor wet adhesion exhibited by plasma polymerized tetrafluoroethylene and hexafluoroethane in Example 1 below.

A further problem which may be encountered during the lifetime of a galvanic cell is that of internal or external corrosion. Internal corrosion of interior corrodible cell members may undesirably increase the internal resistance of the cell, particularly during high temperature storage. External corrosion may detract from the cell's marketability or interfere wih the cell's contact with the device into which such cell is to be inserted. As is apparent to those skilled in the art, conventional coating of the external surfaces of the components of the cells housing or the internal surfaces of interior corrodible cell components with a protective layer is precluded as such layer will interfere with the cell's operation due to the high electrical resistance of such coating. Therefore, there is a need for a galvanic cell having internal and/or external surfaces which exhibit increased resistance to corrosion, which corrosion resistance means does not interfere with the effective operation of the cell.

Accordingly, it is an object of the present invention to provide a galvanic cell which exhibits improved resistance to electrolyte leakage.

It is another object of this invention to provide a galvanic cell which exhibits increased resistance to internal and/or external corrosion, which cell does not exhibit increased internal resistance or impaired contacts due to such corrosion resistance means.

It is a yet another object of this invention to provide a process for treating at least a portion of at least one surface of at least one component of a galvanic cell such that, when assembled, said cell will exhibit increased resistance to electrolyte leakage and/or to corrosion.

The foregoing and additional objects of this invention will become apparent from the following description and accompanying drawings and examples.

DESCRIPTION OF THE INVENTION

This invention relates to a sealed galvanic cell comprising a cathodic material, an anodic material and an electrolyte housed in a container having an open end and a container sealing surface, said container being sealed at its open end by a cover having a cover sealing surface with a non-conductive gasket compressively disposed therebetween, said gasket having a first gasket sealing surface and a second gasket sealing surface, said first gasket sealing surface and said second gasket sealing surface being in interfacial sealing contact with the container sealing surface and the cover sealing surface respectively; characterized in that at least a portion of at least one of the cover sealing surface, the container sealing surface, the first gasket sealing surface and the second gasket sealing surface is coated with a tightly adhering layer of polymeric material which is no thicker than about 2000 angstroms, such polymeric layer being comprised of at least one component selected from the group consisting of hydrocarbons, oxygen-containing hydrocarbons, nitrogen-containing hydrocarbons, sulfur-containing hydrocarbons, phosphorous-containing hydrocarbons and organometallic compounds, said polymeric layer having been deposited by plasma polymerization or sputtering.

In another aspect this invention relates to a sealed galvanic cell comprising a cathodic material, an anodic material, a corrodible component and an electrolyte housed in a container having an open end and a container having an open end, said container being closed at its open end by a cover with a non-conductive gasket compressively disposed between said cover and container; characterized in that at least a portion of at least one of the surfaces of the cover, the container, the gasket or the interior corrodible component is coated with a tightly adhering layer of polymeric material which is no thicker than about 2000 angstroms, such polymeric layer being comprised of at least one component selected from the group consisting of hydrocarbons, oxygen-containing hydrocarbons, nitrogen-containing hydrocarbons, sulfur-containing hydrocarbons, phosphorous-containing hydrocarbons and organometallic compounds, said polymeric layer having been deposited by plasma polymerization or sputtering.

In yet another aspect, this invention relates to a process for treating at least one member of a galvanic cell housing such that the assembled cell will exhibit increased resistance to electrolyte leakage, said process comprising the steps:

(a) providing at least one member of a cell housing said member having a portion which is adapted to function as a sealing surface; and (b) depositing a tightly adhering layer of polymeric material composed of at least one component selected from the group consisting of hydrocarbons, oxygen-containing hydrocarbons, nitrogen-containing hydrocarbons, sulfur-containing hydrocarbons, phosphorous-containing hydrocarbons and organometallic compounds, said layer being no thicker than about 2000 angstroms, by plasma polymerization or sputtering onto at least a portion of said portion of said cell housing which is adapted to function as a sealing surface.

In another aspect this invention is directed to a process for treating at least one corrodible component of a galvanic cell such that the assembled cell will exhibit increased resistance to corrosion, said process comprising the steps:

(a) providing at least one corrodible component of a galvanic cell; and (b) depositing a tightly adhering layer of polymeric material comprised of at least one component selected from the group consisting of hydrocarbons, oxygen-containing hydrocarbons, nitrogen-containing hydrocarbons, sulfur-containing hydrocarbons, phosphorus-containing hydrocarbons and organometallic compounds, said layer being no thicker than about 2000 angstroms, by plasma polymerization or sputtering onto at least a portion of at least one surface of said cell component.

It is within the scope of this invention to coat a portion of or the entire outside surface of an assembled galvanic cell. Thus the term "at least one corrodible component" encompasses components which have already been assembled into a galvanic cell.

As is employed herein the term "cell housing" encompasses the cell cover, container and sealing gasket. The term "sealing surface" refers to a portion of a member of the cell's housing which portion is adapted to be disposed opposite a portion of a second member of the cell's housing such that a seal is formed at the interface of such portions, whereas the term "corrodible component" refers to a component of the cell which is subject to internal and/or external corrosion in the assembled cell. Such corrodible components include interior components, such as anode or cathode collectors, or components of the cell's housing. Moreover, as is employed herein the term "cathodic material" encompasses solid, liquid and gaseous cathodes, as well as materials adapted to serve as conductive substrates for gases such as are employed in air-depolarized cells.

Sputtering is a process in which material is removed from a source or target by a plasma and deposited on a substrate. The use of radio-frequency (r-f) sputtering of polymers is known in the art and is described in some detail in Kirk-Othmer *Encyclopedia of Chemical Technology*, Volume 10, at pages 258–260, John Wiley &

Sons (3d Ed. 1980). Because sputtering is a high energy process, polymeric materials which are made to adhere to substrates by the sputtering method will typically exhibit good adherence to such substrate. It is noteworthy that the coating produced by the sputtering of organic polymeric targets will have "marked differences" from the original polymeric target. According to Kirk-Othmer, supra, page 260 at lines 4–6, at least in the case of polytetrafluoroethylene (and likely parylene) "evidence of amorphous structure and increased hardness appears to indicate that sputter coatings contain a greater amount of cross-linking and molecular disorientation." Thus, sputtered coatings differ markedly from coatings of similar composition accomplished by different processes.

The process of plasma polymerization or glow-discharge polymerization is also known in the art and is described in Kirk-Othmer, *Encyclopedia of Chemical Technology*, Volume 10 at pages 262–265 John Wiley & Sons (3d Ed. 1980). In plasma polymerization, a substance in the vapor phase is excited to luminescence by an electric discharge, and a solid film is deposited on surfaces exposed to the luminous plasma. According to Kirk-Othmer at pages 264–265, the product deposited by plasma polymerization is highly branched, cross-linked and unsaturated regardless of the starting vapor. Thus a material which has been deposited by means of plasma polymerization will differ markedly from conventional polymers of the monomer or monomers employed.

As employed herein the term "plasma polymerization" encompasses the technique of chemical vapor deposition.

As used herein the term "polymeric material" when used in connection with sputtering methods will refer to the coating produced when a polymer is employed as the target in the sputtering technique. When used in connection with plasma polymerization methods, the term "polymeric material" will refer to the coating produced when low molecular weight compounds are fed into the plasma polymerization reaction chamber.

The polymers which may be employed as the target for sputtered coatings are comprised of at least one component selected from the group consisting of hydrocarbons, oxygen-containing hydrocarbons, nitrogen-containing hydrocarbons, sulfur-containing hydrocarbons, phosphorous-containing hydrocarbons and organometallic compounds. In this context the term hydrocarbons encompasses both saturated and unsaturated aliphatic hydrocarbons, aromatic hydrocarbons, saturated and unsaturated cyclic hydrocarbons, as well as mixtures thereof. Representative of the organometallic compounds which may be employed are organosilicon and organotin compounds. Illustrative of such target polymers are polypropylene, polyethylene, and the like. The particular polymer target which is most preferably employed will vary with the particular cell system selected.

The low molecular weight compounds which may be employed for plasma deposited coatings comprise at least one member selected from the group consisting of hydrocarbons, oxygen-containing hydrocarbons, nitrogen-containing hydrocarbons, sulfur-containing hydrocarbons, phosphorous-containing hydrocarbons and organometallic compounds. In this context the term hydrocarbons encompasses both saturated and unsaturated aliphatic hydrocarbons, aromatic hydrocarbons, saturated and unsaturated cyclic hydrocarbons, as well as mixtures thereof. Representative of the organometallic compounds which may be employed are organosilicon and organotin compounds. Illustrative of the low molecular weight compounds which may be employed are methane, ethane, propane, propylene, siloxanes and the like. Moreover, a mixture of one of the above compounds and a halogen-substituted compound may be employed. The amounts of halogen-substituted compound which may be incorporated will depend upon various factors including the substrate selected, the halogen-substituted compound employed, the low molecular weight compound employed, the voltage employed in the polymerization deposition, and other similar factors. However, the optimum proportions for a given situation may be determined by one skilled in the art by simple experimentation. A process for the plasma deposition of such mixed coatings is detailed in U.S. Pat. No. 4,366,208. The choice of compound which is selected will depend in large part upon the cell system employed. For alkaline cells methane and propylene have been found to be particularly advantageous.

The polymeric material layer in either sputtering or plasma deposited coatings is no more than about 2000 angstroms thick as coatings thicker than about 2000 angstroms are frequently too brittle so as to cause cohesive failure during cell construction. Although the preferable thickness of the polymeric layer will vary in accordance with the composition of such layer, in general such layer is preferably no more than about 500 angstroms and is most preferably between about 75 angstroms and about 125 angstroms thick.

Because of the extreme thinness (i.e., less than about 2000 angstroms) of the layer of polymeric material employed in the cell of this invention, it is possible to coat the surfaces of those cell components which are to function as conductive surfaces without materially impairing cell operation. Thus, the surfaces of internal components, such as anode collectors or cathode collectors, or of external contacts may be protected from corrosion without increasing the internal resistance of the cell to undesirable levels. Thus, if desired, the entire surface of any of the housing components of the cell may be coated without adverse effect.

Additionally, it is within the scope of this invention to coat the thin layer of polymeric material with a second polymeric layer. Such a second polymeric layer is particularly applicable where the sealing surfaces of the cell are coated in accordance with this invention. The second polymeric layer may be applied by any technique including evaporation, sputtering or plasma polymerization, independently of whether the first layer was deposited by sputtering or plasma polymerization. Illustrative of the compounds which may be employed are parylene (poly-p-xylylene), polytetrafluoroethylene, siloxane and the like.

Moreover, it is also within the scope of this invention to treat the thin layer of polymeric material with a halogen-containing and/or silicon-containing plasma in order to deposit halogen and/or silicon on the surface of such layer. A particularly preferred treatment is to subject the polymeric film to $C_2F_6$ plasma. This treatment will provide the film with hydrophobic layer without destroying the improved adherence of the underlying layer relative to plasma deposited fluorine-containing materials (see Example 1).

The cell cover and container of the cells of this invention may be composed of metals such as nickel, steel, copper, copper-clad steel, monel (an alloy of copper and nickel), brass, nickel-plated steel and the like.

The cells of this invention employ compressible gaskets which are typically composed of nylon, polypropylene, ethylene-tetrafluoroethylene copolymer, high density polyethylene and the like. When a portion of the surface of a cell component other than the sealing gasket has been treated in accordance with this invention a particularly preferred gasket is that described in copending U.S. patent application Ser. No. 564,250 filed on Dec. 22, 1983, which gasket has been plasma treated with a saturated fluorocarbon to increase its electrolyte repellence.

When the sputtering method of deposition is employed, the coating of a desired portion of a surface of a cell component is typically accomplished as follows. When components having metal surfaces are to be treated in accordance with the process of this invention the surfaces to be coated are first degreased by washing with trichloroethylene followed by rinsing with distilled water. Such surfaces may then be prepared for reception of the sputtered coating by appropriate gas plasma treatment. For example, treatment with $O_2$ plasma will remove organic material while treatment with $H_2$ plasma will reduce oxides present on the surface. Other cleaning methods could also be used. The metallic component having such cleaned surfaces (or a nonmetallic cell component) is placed on the base plate portion of the apparatus opposite the target polymer. Argon gas is introduced into the system and sputtering initiated by subjecting the polymer to r-f radiation. If desired, areas of the cell component may be masked so that only the desired portion of such component is coated.

When plasma polymerization deposition is employed, this process is typically accomplished as follows. When components having metal surfaces are to be treated such surfaces are first degreased by washing with trichloroethylene followed by rinsing with distilled water. Such metallic surfaces may then be prepared for reception of the plasma polymerized coating by appropriate gas plasma treatment, as is described above, or other cleaning methods may be employed. The cell component having such cleaned metal surfaces or the nonmetallic cell component is placed into the plasma polymerization reactor. The low molecular weight compounds to be used are then introduced into the reactor and plasma polymerization initiated. If desired, areas of the cell component may be masked so that only the desired portion of such cell component is coated.

BRIEF DESCRIPTION OF THE DRAWINGS

The present invention will become more apparent from the following description thereof when considered together with the accompanying drawing which is set forth as being exemplary of an embodiment of the present invention and is not intended in any way to be limitative thereof and wherein.

DETAILED DESCRIPTION OF THE DRAWINGS

Figure 1:
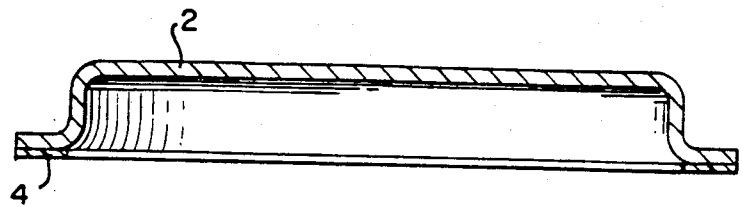
FIG. 1 is a cross-sectional view of a cell cover wherein a portion of the sealing surface of such cover has been coated with a layer of polymeric material by plasma polymerization.

Referring now to FIG. 1 there is shown a cell cover 2. A portion of the sealing surface of cover 2 is coated with plasma polymerization desposited layer 4. If desired the entire sealing surface of cover 2 could be coated. Moreover, if desired, the entire inner and/or outer surfaces could be coated with a layer of polymeric material deposited by plasma polymerization or sputtering. Polymeric layer 4 is no more than about 2000 angstroms thick.

Figure 2:
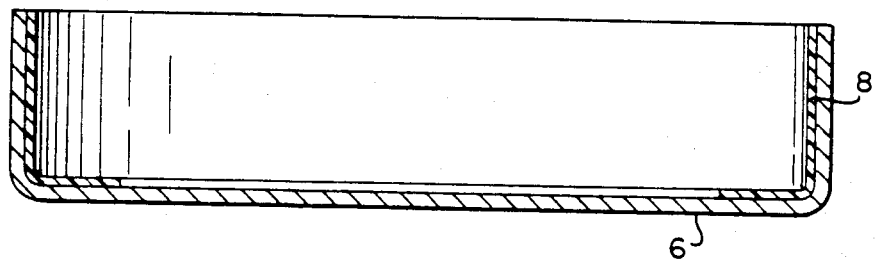
FIG. 2 is a cross-sectional view of a cell container wherein a portion of the sealing surface of said container has been coated with a layer of polymeric material by plasma polymerization.

FIG. 2 shows a cross-sectional view of cell container 6. The sealing surface of container 4 is coated with plasma polymerization deposited polymeric layer 8. If desired, only a portion of the sealing surface or, alternatively, the entire inside and/or outside surfaces of container 6 could be coated. Polymeric layer 8 is no more than about 2000 angstroms thick.

Figure 3:
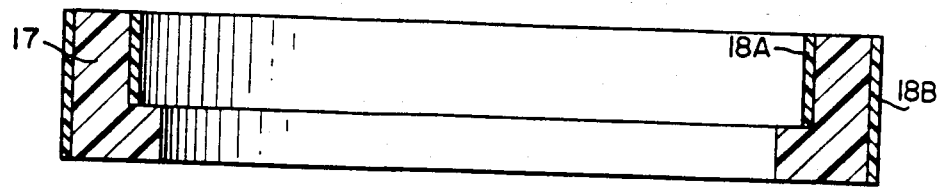
FIG. 3 is a cross-sectional view of a sealing gasket wherein a portion of the sealing surfaces of such gasket has been coated with a layer of polymer material by sputtering.

FIG. 3 shows a cross-sectional view of a sealing gasket 17, having portions of the first gasket sealing surface and second gasket sealing surface covered with tightly adhering layers of sputter-deposited polymeric material, 18B and 18A respectively. Alternatively these layers could be deposited by plasma-polymerization techniques. Such polymeric layers are not thicker than about 2000 angstroms.

Figure 4:
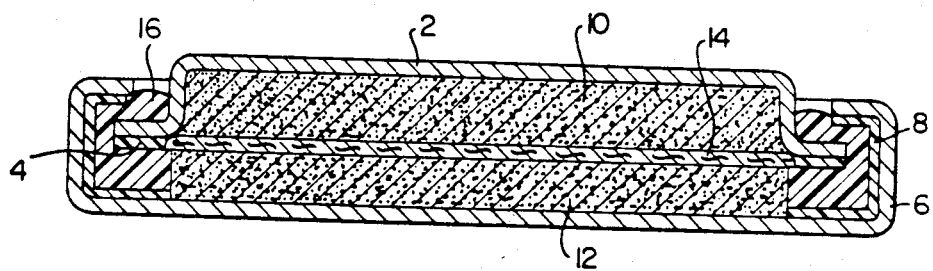
FIG. 4 is a cross-sectional view of an assembled cell employing the coated cover and housing of FIGS. 1 and 2.

FIG. 4 shows an assembled miniature cell having a housing comprised of cover 2, a portion of the sealing surface of which is coated with plasma polymerization deposited layer 4, and container 6, the sealing surface of which is coated with plasma polymerization deposited layer 8. The sealing surface of container 6 is disposed in interfacial sealing contact with the first gasket sealing surface of gasket 16 while the sealing surface of cover 2 is disposed in interfacial sealing contact with the second gasket sealing surface of gasket 16. Disposed within cover 2 and in electrical contact therewith is anode 10, thereby adapting cover 2 as the anodic or negative terminal of the cell. Disposed within container 6 and in electrical contact therewith is cathode 12, thereby adapting container 6 as the cathodic or positive terminal of the cell. Anode 10 is separated from cathode 12 by separator 14. Compressively disposed between cover 2 and container 6 is nonconductive sealing gasket 16. Optionally, the sealing surfaces of gasket 16 could be covered with a plasma polymerization deposited or a sputtering deposited layer of polymeric material. The presence of the layer of polymeric material at the sealing surfaces of the cell will reduce the ability of the cell's electrolyte to creep along such surfaces and leak from the cell.

Figure 5:
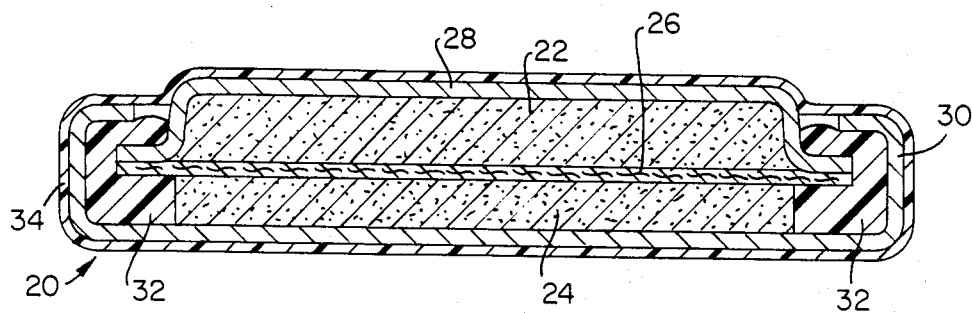
FIG. 5 is a cross-sectional view of an assembled cell wherein the entire outside surface of the cell housing has been coated with a layer of polymeric material by plasma polymerization.

FIG. 5 shows a cross-sectional view of an assembled galvanic cell wherein the entire outside surface of the cell has been coated with a layer of polymeric material by plasma polymerization after assembly of the cell. Cell 20 is comprised of anode 22 and cathode 24 with separator 26 disposed therebetween. Anode 22 is in contact with cover 28 thereby adapting cover 28 as the anodic or negative terminal of the cell. Similarly, cathode 24 is in contact with container 30 thereby adapting container 30 as the cathodic or positive terminal of cell 20. Compressively disposed between cover 28 and container 30 is nonconductive sealing gasket 32. Layer of polymeric material 34, which has been deposited by plasma polymerization coats the entire outside surface of cell 20 thereby protecting the cell from external corrosion. Alternatively, layer 34 could be disposed by sputtering.

Figure 6:
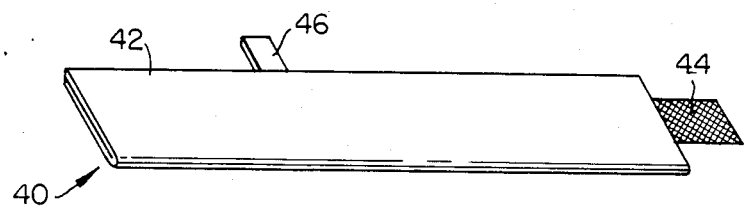
FIG. 6 is an elevational view of an electrode assembly for use in a galvanic cell wherein the anode collector has been coated with a layer of polymeric material by plasma polymerization.

FIG. 6 shows an elevational view of an electrode assembly which is adapted to be coiled and inserted into a cell having a jellyroll construction. Electrode assembly 40 is comprised of separator 42 which extends between a positive electrode (not shown) and negative electrode 44, and, optionally, which extends about the exterior of such electrodes, encapsulating them. Connective tab 46 extends to the positive electrode.

Figure 7:
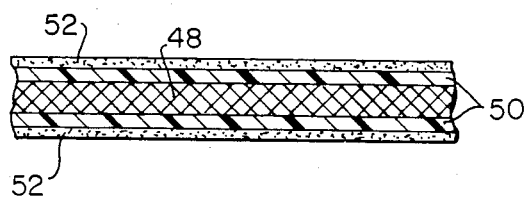
FIG. 7 is an enlarged cross sectional view of the anode collector of FIG. 6.

As is shown in enlarged detail in FIG. 7, negative electrode 44 is comprised of expanded metal screen 48, which is coated with layer of polymeric material 50, layer 50 having been deposited by plasma polymerization. Anodic material 52 is pressed onto the coated screen 48. Layer of polymeric material 50 protects metal screen 48 from corrosion while avoiding materially increasing the internal resistance of the cell.

EXAMPLES

The following Examples are intended to further illustrate the invention and are not intended to limit the scope of the invention in any manner.

EXAMPLE 1

Several copper-clad stainless steel plates, each measuring 2 cm in height and 2 cm in width were cleaned with trichloroethylene and rinsed with distilled water to remove grease from the copper surface. Oxides present on the surface were removed by plasma treatment with hydrogen gas. This treatment was accomplished in a capacitively coupled bell jar plasma reactor having a fixed frequency of 10 KHz. The gas flow rate during this treatment was 3 cc (STP)/min. and the electrical discharge power was 30 watts. The moving plate on which the sample plates were mounted was rotated at a speed of 50 r.p.m. so that the substrate passed between the electrodes on each rotational cycle thereby ensuring a uniform coating.

The cleaned and deoxidized plates were plasma-coated utilizing the compounds listed in Table 1 below until the thickness of the coating was determined to be about 300 angstroms. In order to produce such coating the power was varied from 30-120 watts and the compound flow rate varied from 0.5-3.0 cc(STP)/min. depending on the compound used. As is shown in Table 1, several of the samples were subsequently treated with $C_2F_6$ plasma. In this context it is worth noting that treatment with $C_2F_6$ plasma alone will result in the deposition of fluorine atoms on the polymeric layer in a reaction which is in a practical sense self-limiting, whereas treatment with a mixture of $C_2F_6$ and $H_2$ plasma will produce a polymeric layer of $C_2F_6$ material.

In all the Examples contained herein a plus sign "+" when used in conjunction with $C_2F_6$ will indicate that $C_2F_6$ is employed in the plasma along with the other compound listed. The use of a slash "/" when used in conjunction with $C_2F_6$ will indicate a subsequent treatment with $C_2F_6$ polymer alone of the plasma deposited coating listed. During such $C_2F_6$ treatment the gas flow varied from 3-5 cc (STP)/min. and the electrical discharge varied from 15-30 watts.

The adhesion of the coated polymers was measured by a pressure sensitive tape test ANSI/ASTM D-3359-76 under the conditions shown in Table 1 below.

TABLE 1

| | Adhesion quality by pressure sensitive tape test* | | |
|---|---|---|---|
| Coating | In Air | After Immersion In Cold (about 20° C.) Water for 15 Hrs. | After Immersion in Boiling Water for 2 Hrs. |
| methane | O | O | O |
| methane/$C_2F_6$ | O | O | O |
| tetramethyl-disiloxane | O | O | O |
| tetramethyl-disiloxane/$C_2F_6$ | O | O | O |
| propylene | | | |
| Propylene/$C_2F_6$ | O | O | O |
| $C_2F_6$ + $H_2$ mixture | O | O | X |
| tetrafluoroethylene | O | O | X |

*O - pass - equivalent to 5A on ASTM scale
X - fail - equivalent to 4A or less on ASTM scale The above results indicate the relatively poor maintenance of wet adhesion after immersion in boiling water demonstrated by fluorine-containing polymers which have been plasma deposited.

Several additional samples were prepared as above. The coated plates were scratched in a cross-hatched pattern, presoaked in cold (i.e. about 20° C.) water for 30 days, and their subsequent peeling-off time in boiling water measured. The results of such testing are shown in Table 2.

TABLE 2

| Peeling-off Time in Boiling Water after 3-Day Presoak in about 20° C. Water | |
|---|---|
| Polymeric Material | Peeling-off Time (Minutes) |
| tetrafluoroethylene | 2 |
| methane | 7 |
| methane/$C_2F_6$ | 12 |
| propylene | 120 |
| tetramethyldisiloxane | 120 |
| propylene/$C_2F_6$ | 120 |

These results further indicate the relatively poor maintenance of wet adhesion of plasma-deposited fluoropolymers.

Several additional plates were prepared as above except that certain plates (as indicated in Table 3) were not precleaned by washing in trichloroethylene. The plates were then placed in a 41 weight percent KOH solution, such that the lower edge of the plate just touched the liquid. A voltage of −1.15 vs. Hg/HgO was applied to the plates, and the increase in height along the copper surface after 6 hours measured. The results of such creepage tests are shown in Table 3 below.

TABLE 3

| Coating | Creepage Distance, cm/6 Hrs | |
|---|---|---|
| | Cleaned Plates* | Uncleaned Plates* |
| Control (None) | .941 | — |
| Propylene | .492 | .798 |
| Propylene/$C_2F_6$ | .254 | .868 |
| Tetramethyldisiloxane | .497 | .577 |
| Methane | .452 | .458 |
| Methane/$C_2F_6$ | .356 | .356 |
| Tetrafluoroethylene | .871 | .829 |

*Average Values

The above results indicate that a correlation between sustained wet adhesion and resistance to creepage exists as tetrafluoroethylene exhibits poorer creepage resistance as well as poorer sustained wet adhesion. The results also demonstrate the improvement obtained by washing the substrate to be treated with trichloroethylene.

EXAMPLE 2

Employing an apparatus similar to that described in Example 1, the copper side of several triclad (i.e., copper-stainless steel-nickel) plates was coated with a layer of plasma polymerization deposited polymeric material as shown in Table 4 below. As a control, one plate remained untreated. As noted in Table 4, the copper surface of several of the samples was pretreated with $H_2$ plasma and the layer of plasma deposited polymeric material treated with $C_2F_6$ plasma. The sample plates were placed in a fixture contacting both surfaces with a cross-sectional area of ½ inch² at a pressure of 80 grams and resistances from one contact to the other were measured after zeroing the fixed resistance. The results of such testing are summarized in Table 4 below:

TABLE 4

RESISTANCE OF PLASMA-COATED TRICLAD SAMPLES

| Sample | Hydrogen-Plasma Pretreatment | Composition of Monomer Forming Polymeric Layer | Thickness of Polymer Layer* | $C_2F_6$ Plasa Treatment of Polymeric Layer | Measured Resistance** |
|---|---|---|---|---|---|
| 1 (control) | No | None | None | No | 8 |
| 2 | No | Propylene | 100 | No | 18 |
| 2 | Yes | Methane | 100 | Yes | 11 |
| 4 | Yes | Methane | 500 | Yes | 13 |
| 5 | Yes | Propylene | 1000 | Yes | 64 |

*In angstroms
**In milliohms

The above results indicate that the presence of a thin layer of polymeric material deposited by plasma polymerization does not materially increase the measured resistence of the samples to commercially unacceptable levels.

EXAMPLE 3

Several lots of miniature Zn/$Ag_2O$ cells employing a potassium hydroxide electrolyte, each cell measuring about 0.31 inch (about 0.79 cm) in diameter and about 0.14 inch (about 0.36 cm) in height, were constructed. The anode cups of said cells had a thin layer of polymeric material deposited on their sealing areas utilizing the plasma polymerization reactor of Example 1. This layer was deposited after washing the surfaces with trichloroethylene and rinsing with distilled water, followed by a deoxidizing hydrogen plasma treatment. Several lots of cells were sealed employing a $C_2F_6$ plasma-treated nylon gasket as described in copending U.S. patent application Ser. No. 564,520 filed on Dec. 22, 1983, followed by coating with a fatty polyamide. Other lots employed only fatty polyamide coated gaskets.

The cells so produced were stored for nine weeks at 90% relative humidity and elevated temperature (45° C. and 60° C.). The negative terminal leakage of such cells is indicated in Tables 5 and 6 below.

TABLE 5

Negative Terminal Leakage Characteristics After 9 Weeks at 60° C., 90% R.H.

| Anode Cup Treatment | Gasket Treatment | No. Cells | No. Cells Showing Salting | L* | H** | Percent Salt*** |
|---|---|---|---|---|---|---|
| Control (None) | polyamide-coated | 12 | 11 | 1 | 10 | 92 |
| Methane¹/$C_2F_6$ | polyamide-coated | 15 | 8 | 5 | 3 | 53 |
| Methane¹/$C_2F_6$ | $C_2F_6$ treated, polyamide-coated | 13 | 4 | 3 | 1 | 30 |
| Propylene²/$C_2F_6$ | polyamide-coated | 15 | 4 | 1 | 3 | 27 |
| Propylene²/$C_2F_6$ | $C_2F_6$-treated, polyamide-coated | 15 | 13 | 5 | 8 | 87 |

*L = number of cells showing light salting (i.e. visible at 20x magnification but not with the naked eye) at negative terminal
**H = number of cells showing heavy salting (i.e. visible with the naked eye) at negative terminal
***Percent Salt = percent of total cells showing salting
¹ = polymer thickness 100 Angstroms
² = polymer thickness 500 Angstroms

TABLE 6

Negative Terminal Leakage Characteristics After 9 Weeks at 45° C., 90% R.H.

| Anode Cup Treatment | Gasket Treatment | No. Cells | No. Cells Showing Salting | L | H | Percent Salt |
|---|---|---|---|---|---|---|
| Control (None) | polyamide-coated | 14 | 7 | 2 | 5 | 50 |
| Methane/$C_2F_6$ | polyamide-coated | 15 | 3 | 2 | 1 | 20 |
| Methane/$C_2F_6$ | freon-treated, polyamide-coated | 15 | 0 | 0 | 0 | 0 |
| Propylene/$C_2F_6$ | polyamide-coated | 15 | 1 | 1 | 0 | 7 |
| Propylene/$C_2F_6$ | freon-treated, polyamide-coated | 15 | 3 | 2 | 1 | 20 |

The above results indicate that using the coatings of this invention, a substantial reduction in leakage was obtained.

What is claimed is:

1. A sealed galvanic cell comprising a cathodic material, an anodic material and an electrolyte housed in a container having an open end and a container sealing surface, said container being sealed at its open end by a cover having a cover sealing surface with a non-conductive gasket compressively disposed between said cover and said container, said gasket having a first gasket sealing surface and a second gasket sealing surface, said first gasket sealing surface and said second gasket sealing surface being in interfacial sealing contact with the container sealing surface and the cover sealing surface respectively: characterized in that at least a portion of at least one of the cover sealing surface, the container sealing surface, the first gasket sealing surface and the second gasket sealing surface is coated with a tightly adhering layer of polymeric material which is no thicker than about 2000 angstroms, such polymeric layer being comprised of a plasma polymer of at least one component selected from the group consisting of hydrocarbons, oxygen-containing hydrocarbons, nitrogen-containing hydrocarbons, sulfur-containing hydrocarbons, phosphorous-containing hydrocarbons, and organometallic compounds, said polymeric layer having been deposited by plasma polymerization.

2. The galvanic cell of claim 1 wherein a second layer of polymeric material is deposited over said layer of tightly adhering polymeric material.

3. The galvanic cell of claim 2 wherein said second layer is composed of parylene.

4. The galvanic cell of claim 1 wherein fluorine atoms or silicon atoms are deposited on the surface of the tightly adhering polymeric material.

5. The galvanic cell of claim 1 wherein a portion of the nonsealing area of at least one of the cell cover, container and housing is coated with said layer of polymeric material.

6. The galvanic cell of claim 5 wherein the entire surface of at least one of the cell cover, container and gasket is coated with said layer of polymeric material.

7. The galvanic cell of claim 1 wherein said tightly adhering layer of polymeric material is no more than about 500 angstroms thick.

8. The galvanic cell of claim 1 wherein said tightly adhering layer of polymeric material is between about 75 and about 125 angstroms thick.

9. A sealed galvanic cell comprising a cathodic material, an anodic material and an electrolyte housed in a container having an open end and a container sealing surface, said container being sealed at its open end by a cover having a cover sealing surface with a non-conductive gasket compressively disposed between said cover and said container, said gasket having a first gasket sealing surface and a second gasket sealing surface said first gasket sealing surface and said second gasket sealing surface being in interfacial sealing contact with the container sealing surface and the cover sealing surface respectively: characterized in that at least a portion of at least one of the cover sealing surface, the container sealing surface, the first gasket sealing surface and the second gasket sealing surface is coated with a layer of polymeric material which is no thicker than about 2000 angstroms, said layer being comprised of a sputtered polymer of at least one component selected from the group consisting of hydrocarbons, oxygen-containing hydrocarbons, nitrogen-containing hydrocarbons, sulfur-containing hydrocarbons, phosphorous-containing hydrocarbons, and organometallic compounds, said polymeric layer having been deposited by sputtering.

10. The galvanic cell of claim 9 wherein a second layer of polymeric material is deposited over said layer of tightly adhering polymeric material.

11. The galvanic cell of claim 10 wherein said second layer is composed of parylene.

12. The galvanic cell of claim 9 wherein fluorine atoms or silicon atoms are present on the surface of the tightly adhering polymeric material.

13. The galvanic cell of claim 9 wherein a portion of the nonsealing area of at least one of the cell cover, container and gasket is coated with said polymeric layer.

14. The galvanic cell of claim 13 wherein the entire surface of at least one of the cell cover, container and gasket is coated with said layer of polymeric material.

15. The galvanic cell of claim 10 wherein said tightly adhering layer of polymeric material is no more than about 500 angstroms thick.

16. The galvanic cell of claim 10 wherein said tightly adhering layer of polymeric material is between about 75 and about 125 angstroms thick.

17. A sealed galvanic cell comprising a cathodic material, an anodic material, a corrodible component and an electrolyte housed in a container having an open end, said container being closed at its open end by a cover with a non-conductive gasket compressively disposed between said cover and said container; characterized in that at least a portion of at least one of the surfaces of the cover, the gasket or the corrodible component is coated with a tightly adhering layer of polymeric material which is no thicker than about 2000 angstroms, such polymeric layer being comprised of a plasma polymer of at least one component selected from the group consisting of hydrocarbons, oxygen-containing hydrocarbons, nitrogen-containing hydrocarbons, sulfur-containing hydrocarbons, phosphorous-containing hydrocarbons, and organometallic compounds, said polymeric layer having been deposited by plasma polymerization.

18. The galvanic cell of claim 17 wherein said tightly adhering layer of polymeric material is no more than about 500 angstroms thick.

19. The galvanic cell of claim 17 wherein said tightly adhering layer of polymeric material is between about 75 and about 125 angstroms thick.

20. The galvanic cell of claim 17 wherein the entire external surface of the cell is coated with said tightly adhering layer of polymeric material.

21. A sealed galvanic cell comprising a cathodic material, an anodic material, a corrodible component and an electrolyte housed in a container having an open end, said container being sealed at its open end by a cover with a non-conductive gasket compressively disposed between said cover and said container; characterized in that at least a portion of at least one of the surfaces of the cover, the gasket or the corrodible component is coated with a layer of polymeric material which is no thicker than about 2000 angstroms, said layer being comprised of a sputtered polymer of at least one component selected from the group consisting of hydrocarbons, oxygen-containing hydrocarbons, nitrogen-containing hydrocarbons, sulfur-containing hydrocarbons, phosphorous-containing hydrocarbons, and organometallic compounds, said polymeric layer having been deposited by sputtering.

22. The galvanic cell of claim 21 wherein said tightly adhering layer of polymeric material is no more than about 500 angstroms thick.

23. The galvanic cell of claim 21 wherein said tightly adhering layer of polymeric material is between about 75 and about 125 angstroms thick.

24. The galvanic cell of claim 21 wherein the entire external surface of the cell is coated with said tightly adhering layer of polymeric material.

25. A process for treating at least one member of a galvanic cell housing such that the assembled cell will exhibit increased resistance to electrolyte leakage, said process comprising the steps:
(a) providing at least one member of a cell housing said member having a portion which is adapted to function as a sealing surface; and
(b) depositing a tightly adhering layer of polymeric material composed of a plasma polymer of at least one component selected from the group consisting of hydrocarbons, oxygen-containing hydrocarbons, nitrogen-containing hydrocarbons, sulfur-containing hydrocarbons, phosphorus-containing hydrocarbons, and organometallic compounds, said layer being no thicker than about 2000 angstroms, by plasma polymerization onto at least a portion of said portion of said cell housing which is adapted to function as a sealing surface.

26. The process of claim 25 wherein a metallic housing member is provided in step (a) and wherein step (a') is performed after step (a) and prior to step (b), step (a') comprising:
(a') washing the portion of said housing member which is adapted to function as a sealing surface with trichloroethylene.

27. The process of claim 25 wherein step (a'') is performed after step (a) and prior to step (b), step (a'') comprising:
(a'') treating at least a portion of said cell housing which is adapted to function as a sealing surface with a gas plasma.

28. The process of claim 27 wherein the gas plasma is selected from the group consisting of $H_2$ plasma and $O_2$ plasma.

29. The process of claim 25 wherein step (c) is performed after step (b), step (c) comprising:
(c) depositing a second layer of polymeric material onto said tightly adhering layer of polymeric material.

30. The process of claim 29 wherein said second layer of polymeric material is composed of parylene.

31. The process of claim 25 wherein step (c') is performed following step (b), step (c') comprising:
(c') depositing fluorine atoms on the surface of said tightly adhering layer of polymeric material by plasma treating said surface with a fluorine-containing compound.

32. The process of claim 31 wherein the fluorine-containing compound is $C_2F_6$.

33. The process of claim 25 wherein step (c'') is performed after step (b), step (c'') comprising: (c'') depositing silicon atoms on the surface of said tightly adhering layer of polymeric material by plasma treating said surface with a silicon-containing compound.

34. The process of claim 25 wherein the tightly adhering layer of polymeric material deposited in step (c) is no more than about 500 angstroms thick.

35. The process of claim 25 wherein the tightly adhering layer of polymeric material deposited in step (c) is between about 75 and about 125 angstroms thick.

36. A process for treating at least one member of a galvanic cell housing such that the assembled cell will exhibit increased resistance to electrolyte leakage, said process comprising the steps:
(a) providing at least one member of a cell housing said member having a portion which is adapted to function as a sealing surface; and
(b) depositing a tightly adhering layer of polymeric material composed of a sputtered polymer of at least one component selected from the group consisting of hydrocarbons, oxygen-containing hydrocarbons, nitrogen-containing hydrocarbons, sulfur-containing hydrocarbons, phosphorus-containing hydrocarbons, and organometallic compounds said layer being no thicker than about 2000 angstroms, by sputtering onto at least a portion of said portion of said cell housing which is adapted to function as a sealing surface.

37. The process of claim 36 wherein a metallic housing member is provided in step (a) and wherein step (a') is performed after step (a) and prior to step (b), step (a') comprising:
(a') washing the portion of said housing member which is adapted to function as a sealing surface with trichloroethylene.

38. The process of claim 36 wherein step (a'') is performed after step (a') and prior to step (b), step (a'') comprising:
(a'') treating at least a portion of the portion of the cell housing which is adapted to function as a sealing surface with a gas plasma.

39. The process of claim 38 wherein the gas plasma is selected from the group consisting of $H_2$ plasma and $O_2$ plasma.

40. The process of claim 36 wherein step (c) is performed after step (b), step (c) comprising:
(c) depositing a second layer of polymeric material onto said tightly adhering layer of polymeric material.

41. The process of claim 40 wherein said second layer of polymeric material is composed of parylene.

42. The process of claim 36 wherein step (c') is performed following step (b), step (c') comprising:
(c') depositing fluorine atoms on the surface of said tightly adhering layer of polymeric material by plasma treating said surface with a fluorine-containing compound.

43. The process of claim 42 wherein the fluorine-containing compound is $C_2F_6$.

44. The process of claim 43 wherein step (c'') is performed following step (b), step (c'') comprising:
(c'') depositing silicon atoms on the surface of said tightly adhering layer of polymeric material by plasma heating said surface with a silicon-containing compound.

45. The process of claim 36 wherein the tightly adhering layer of polymeric material deposited in step (c) is no more than about 500 angstroms thick.

46. The process of claim 36 wherein the tightly adhering layer of polymeric material deposited in step (c) is between about 75 and about 125 angstroms thick.

47. A process for treating at least one corrodible component of a galvanic cell such that the assembled cell will exhibit increased resistance to corrosion, said process comprising the steps:
(a) providing at least one corrodible component of a cell; and
(b) depositing a tightly adhering layer of polymeric material composed of a plasma polymer of at least one component selected from the group consisting of hydrocarbons, oxygen-containing hydrocarbons, nitrogen-containing hydrocarbons, sulfur-containing hydrocarbons, phosporus-containing hydrocarbons, and organometallic compounds, said layer being no thicker than about 2000 angstroms, by plasma polymerization onto at least a portion of at least one surface of said corrodible component.

48. The process of claim 47 wherein a metallic housing member is provided in step (a) and wherein step (a') is performed after step (a) and prior to step (b), step (a') comprising:

(a') washing the surface of said corrodible component with trichloroethylene.

49. The process of claim 47 wherein step (a'') is performed after step (a) and prior to step (b), step (a'') comprising:

(a'') treating at least a portion of the surface of said corrodible component with a gas plasma.

50. The process of claim 49 wherein the gas plasma is selected from the group consisting of $H_2$ plasma and $O_2$ plasma.

51. The process of claim 47 wherein the corrodible component comprises an exterior surface of the cell and steps (a''') is performed after step (a) and before step (b), step (a''') comprising:

(a''') assembling the corrodible component into the cell.

52. The process of claim 50 wherein the tightly adhering layer of polymeric material deposited in step (c) is no more than about 500 angstroms thick.

53. The process of claim 50 wherein the tightly adhering layer of polymeric material deposited in step (c) is between about 75 and about 125 angstroms thick.

54. A process for treating at least one corrodible component of a galvanic cell such that the assembled cell will exhibit increased resistance to corrosion, said process comprising the steps:

(a) providing at least one corrodible component of a cell; and (b) depositing a tightly adhering layer of polymeric material composed of a plasma polymer of at least one component selected from the group consisting of hydrocarbons, oxygen-containing hydrocarbons, nitrogen-containing hydrocarbons, sulfur-containing hydrocarbons, phosphorus-containing hydrocarbons, and organometallic compounds, said layer being no thicker than about 2000 angstroms, by sputtering onto at least a portion of at least one surface of said corrodible component.

55. The process of claim 54 wherein a metallic housing member is provided in step (a) and wherein step (a') is performed after step (a) and prior to step (b), step (a') comprising:

(a') washing the surface of said corrodible component with trichloroethylene.

56. The process of claim 54 wherein step (a'') is performed after step (a) and prior to step (b), step (a'') comprising:

(a'') treating at least a portion of the surface of said corrodible component with a gas plasma.

57. The process of claim 56 wherein the gas plasma is selected from the group consisting of $H_2$ plasma and $O_2$ plasma.

58. The process of claim 54 wherein the corrodible component comprises an exterior surface of the cell and steps (a''') is performed after step (a) and before step (b), step (a''') comprising:

(a''') assembling the corrodible component into the cell.

59. The process of claim 54 wherein the tightly adhering layer of polymeric material deposited in step (c) is no more than about 500 angstroms thick.

60. The process of claim 54 wherein the tightly adhering layer of polymeric material deposited in step (c) is between about 75 and about 125 angstroms thick.

* * * * *

UNITED STATES PATENT AND TRADEMARK OFFICE
CERTIFICATE OF CORRECTION

PATENT NO. : 4,503,133

DATED : March 5, 1985

INVENTOR(S) : Johannes A. van Lier and Hirotsugu Yasuda

It is certified that error appears in the above-identified patent and that said Letters Patent is hereby corrected as shown below:

Column 11, Table 4, last column heading after "Resistance" delete "*" and substitute therefor --**--.

Column 16, Line 23, (Claim 38), delete "(a')" and substitute therefor --(a)--.

Column 16, Line 46, (Claim 44) delete "43" and substitute therefor --36--.

Column 16, Line 53, (Claim 45), delete "(c)" and substitute therefor --(b)--.

Column 16, Line 56, (Claim 46), delete "(c)" and substitute therefor --(b)--.

Column 17, Line 28, (Claim 52), delete "(c)" and substitute therefor --(b)--.

Column 17, Line 31, (Claim 53) delete "(c)" and substitute therefor --(b)--.

Column 18, Line 2, (Claim 54), delete "plasma" and substitute therefor --sputtered--.

UNITED STATES PATENT AND TRADEMARK OFFICE
CERTIFICATE OF CORRECTION

PATENT NO. : 4,503,133

DATED : March 5, 1985

INVENTOR(S) : Johannes A. van Lier and Hirotsugu Yasuda

It is certified that error appears in the above-identified patent and that said Letters Patent is hereby corrected as shown below:

Column 18, Line 32, (Claim 59), delete "(c)" and substitute therefor --(b)--.

Column 18, Line 35, (Claim 60), delete "(c)" and substitute therefor --(b)--.

Signed and Sealed this

Seventeenth Day of September 1985

[SEAL]

Attest:

Attesting Officer

DONALD J. QUIGG

Commissioner of Patents and Trademarks—Designate